F. BANGERTER.
FRICTION CLUTCH.
APPLICATION FILED OCT. 27, 1915.
1,262,909.
Patented Apr. 16, 1918.
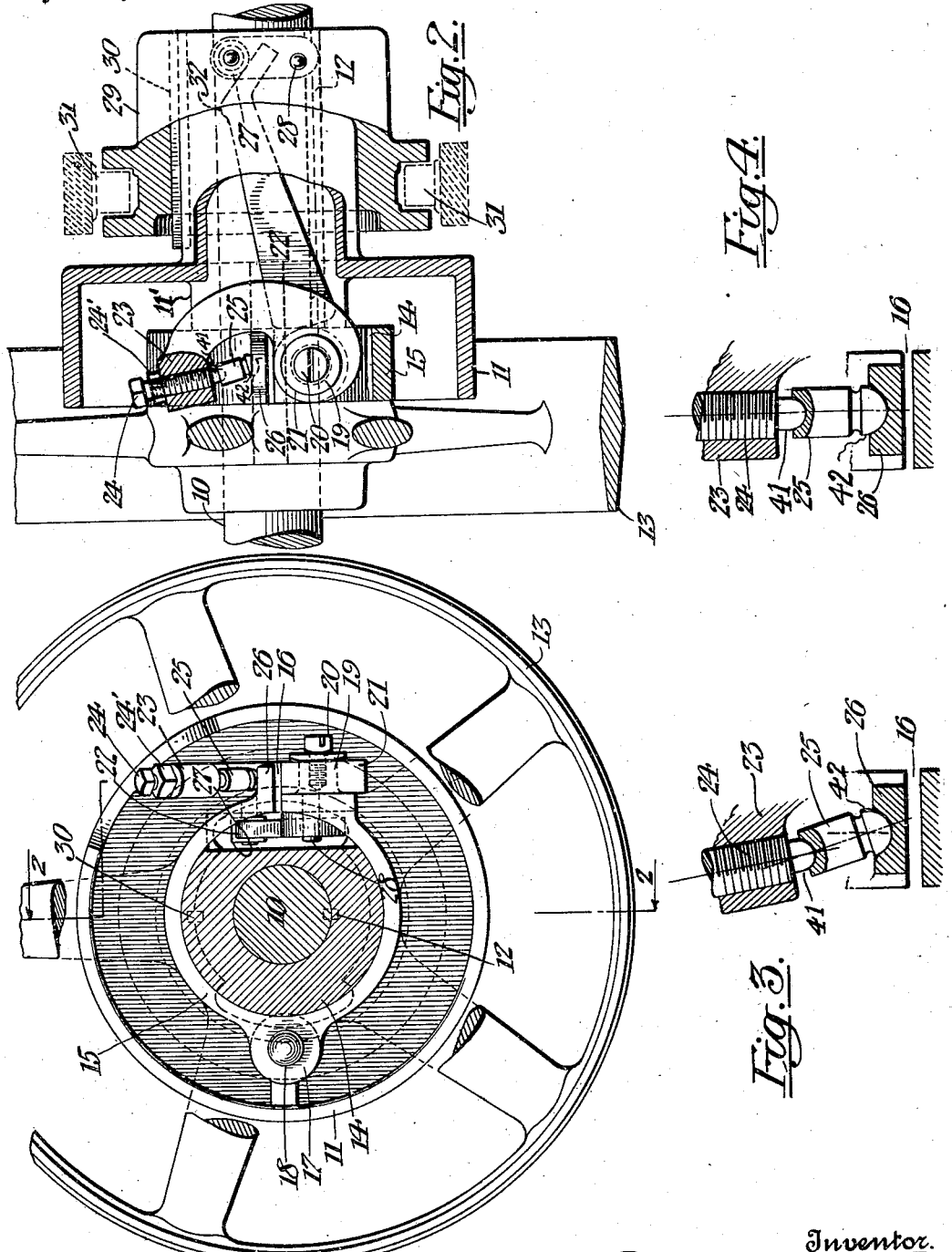

UNITED STATES PATENT OFFICE.

FRIEDRICH BANGERTER, OF NEW YORK, N. Y., ASSIGNOR TO MORRIS D. KOPPLE, OF FAR ROCKAWAY, NEW YORK.

FRICTION-CLUTCH.

1,262,909.  Specification of Letters Patent.  Patented Apr. 16, 1918.

Application filed October 27, 1915.  Serial No. 58,106.

*To all whom it may concern:*

Be it known that I, FRIEDRICH BANGERTER, a citizen of the Republic of Switzerland, residing at New York city, in the county of New York, State of New York, have invented certain new and useful Improvements in Friction-Clutches; and I declare the following to be a full, true, and exact description of said invention, such as will enable others skilled in the art to which it appertains to make use of the same.

The present invention relates to improvements in friction clutches which are ordinarily used to connect and disconnect a driven member from a driving member. One of the objects of my invention is to provide a clutch which will have great gripping power in proportion to the force exerted to throw in the clutch, and which will be self-locking to prevent the release of the clutch until desired. Another object of my invention is to provide a clutch which will operate positively both to connect and disconnect the friction devices.

With these and other objects in view, my invention consists of certain novel features of construction, combination and arrangement of parts as will be more fully set forth and described in the appended claims.

In the drawings, Figure 1 is a sectional elevation of one form of my novel device which I have chosen for purposes of illustration, having portions broken away to show more clearly the operating devices.

Fig. 2 is a side elevation of Fig. 1, partly in section, on the line 2—2 of Fig. 1.

Figs. 3 and 4 illustrate portions of the toggle mechanism shown in Figs. 1 and 2, but enlarged so as to show more clearly the operation thereof, Fig. 3 showing the toggle in its broken position, and Fig. 4, in its straight position.

The corresponding parts are referred to both in the drawings and in the specification by similar reference characters.

In the form which I have chosen for illustration, 10 is a driven shaft on which is mounted a driven member 11 in the form of a hubbed shell, this driven member being keyed to the shaft 10 by the key 12. 13 is the driving member, in this instance illustrated as a pulley which normally is free to rotate on the shaft 10. The driving member 13 has a friction hub 14 and surrounding this hub is a friction band 15. In the preferred form this band is a ring bored to the right diameter and cut, as at 16, so that the two ends of the ring may be collapsed to decrease its diameter. Obviously this band may be constructed in one of a number of well-known ways, such, for instance, as making the bands of two parts pivoted together. The band 15 is provided with a hub 17 through which projects a pin 18, the pin being fastened in the inwardly projecting hub 11' of the driven member 11. By reason of this connection, as the driven member 11 rotates, the band 15 turns with it. The band 15 is provided with a trunnion 19. On this trunnion and held thereon by the screw and washer 20, is a two-armed lever 21 having the cam arm 22 and the toggle arm 23. In the toggle arm 23 is a screw threaded stud having the rounded end 41. This stud is held in adjusted position by the nut 24'. The arm 23 constitutes one member of a toggle of which the other member is the strut or bar 25. One end of this strut is provided with a rounded recess to engage the projection 41 and the other end is provided with a rounded end 42 which engages a similarly rounded recess in the projection 26 on the band 15. The cam arm 22 of the toggle lever 21 projects through an opening in the driven member 11 so that its end lies between the cam roller 27 and pin 28. A longitudinally slidable member 29 is mounted on the hub of the driven member 11 and splined thereto by the spline 30. This member is provided with a groove to be engaged with a shifter fork in the well-known manner, the rollers of this fork being indicated at 31—31 in dotted lines. The roller 27 and pin 28 are connected to this slidable member 29 and the end of the arm 22 is shaped to provide a cam surface against which the roller 27 may operate when the sliding member 29 is moved to the left of Fig. 2 and a cam surface against which the pin 28 may operate when the sliding member is moved to the right of Fig. 2.

In order to throw in the clutch, the rollers 31—31 are moved to the left of Fig. 2, thus carrying the roller 27 to the left, depressing the arm 22 until the roller 27 reaches the flattened portion 32. The pin 28 during this motion also moves to the left, but the end of the arm 22 is shaped in such a way as not to strike it. The depression of the arm 22 swings the lever 21 so that the stud 24 in the toggle arm 23 is carried from the position shown best in Fig. 3 to the position shown in Fig. 4. An inspection of Fig. 3 will show that the parts are so arranged that when the rollers 31—31 are forced to the right, the points of contact between the stud 24, the strut 25 and the projection 26 are out of alinement. When the lever 23 is moved to the right into the position shown in Fig. 4, it carries the upper end of the strut 25 with it and so rotates the rounded end 42 in the recess in the projection 26. This tends to bring the points of contact in alinement. But since the stud 24 is positively connected to the lever 23, which, in turn, is rotatably connected to the trunnion 19 on the other side of the cut 16 in the band 15, the stud 24 can not move upward, and the bringing of these points of contact into alinement results in the depression of the projection 26. The amount of this depression is relatively very small compared with the amount of motion of the lever 23 and the ends of the friction band are thus brought together with great force. Moreover, when the toggle members are in alinement, as shown in Fig. 4, and the toggle is "made", it will be observed that there is no tendency to rotate the lever 23 so that the friction band will be held clutched to the driving hub, until the lever 23 is rotated to the position shown in Fig. 3, whereby the toggle is positively broken to permit the friction band to expand.

By constructing the member of the toggle, constituted by the stud 24, so that it may be adjusted longitudinally, I have arranged my device so that as the band wears, the toggle stud 24 may be screwed down until the band closely grasps the friction drum when the parts are in the position shown in Fig. 4.

This adjustment also permits the initial setting of the toggle so that the points of contact will be in alinement when the roller 27 has reached the end of its travel.

It will be understood that the construction which I have illustrated is only a specific form of my invention and that the construction and arrangement of parts may be varied within wide limits.

I claim:

1. A friction clutch having in combination a friction drum, a divided friction band constructed and arranged to grip said drum when the diameter of said band is changed, a toggle to change the diameter of said band, comprising a first member having a rounded end engaging in a rounded recess in one end of said band and a second member having a rounded end engaging in a rounded recess in said first member, a two-armed lever, one of the arms of which carries said second member and means to move said lever positively in one direction to make the toggle by bringing its center into alinement and into the opposite direction to break the toggle.

2. A friction clutch having in combination a friction drum, a friction band constructed and arranged to grip said drum when the diameter of said band is changed, a lever, a first member adjustably mounted in one end of said lever, a second member between said first member and said band, said lever and members being constructed and arranged to form a toggle and means to move said lever positively in one direction to make the toggle by bringing its centers into alinement and in the opposite direction to break it.

3. A friction clutch having a driving and a driven member, a friction drum on one of said members, a two-part friction band around said drum and connected to the other of said members, a two-armed lever pivoted on one end of one part of said friction band, one of the arms of said lever forming a toggle member, a second toggle member between said toggle-forming arm of said lever and the end of the other part of said friction band and means to move said lever to make and break the toggle to cause said band to clutch said drum.

FRIEDRICH BANGERTER.

Witnesses:
ESTELLE WALD,
GEORGE F. SCULL.

Copies of this patent may be obtained for five cents each, by addressing the "Commissioner of Patents, Washington, D. C."